(12) United States Patent
Hoshuyama (10) Patent No.: US 7,355,635 B2
(45) Date of Patent: Apr. 8, 2008

(54) ELECTRONIC CAMERA CAPABLE OF HAVING RESULTS OF PREVIOUS IMAGE PICKUP PROCESSING REFLECTED IN CURRENT IMAGE PICKUP PROCESSING

(75) Inventor: Hideo Hoshuyama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 891 days.

(21) Appl. No.: 10/352,201

(22) Filed: Jan. 28, 2003

(65) Prior Publication Data

US 2003/0146983 A1 Aug. 7, 2003

(30) Foreign Application Priority Data

Feb. 1, 2002 (JP) ............................. 2002-025712

(51) Int. Cl.
*H04N 5/235* (2006.01)
(52) U.S. Cl. ................................. 348/222.1
(58) Field of Classification Search ............. 348/223.1, 348/224.1
See application file for complete search history.

(56) References Cited

U.S. PATENT DOCUMENTS 5,128,769 A * 7/1992 Arai et al. .................. 348/363
5,568,187 A * 10/1996 Okino ....................... 348/224.1
6,727,942 B1 * 4/2004 Miyano ..................... 348/223.1
6,963,364 B2 * 11/2005 Haese et al. ................ 348/235

FOREIGN PATENT DOCUMENTS

JP  A 10-290469  10/1998

* cited by examiner

*Primary Examiner*—Lin Ye
*Assistant Examiner*—Anthony J Daniels
(74) *Attorney, Agent, or Firm*—Oliff & Berridge, PLC (57) ABSTRACT

An electronic camera according to the present invention includes an imaging part, a conditional information determining part, a storage part and a correction processing part. The imaging part images a subject to produce image data. The conditional information determining part determines conditional information that is indicative of the conditions of the subject at a time when the subject is imaged. The storage part stores previous conditional information determined by the conditional information determining part. The correction processing part performs correction processings on the image data, according to both the previous conditional information stored in the storage part and the latest conditional information determined by the conditional information determining part. This enables results of the previous correction processings to be reflected in the current processing, thereby realizing the correction processing with both adaptability and stability.

12 Claims, 7 Drawing Sheets

| Color Temp. Weighting Rate | Variation Value of Color Temp. | Variation Value of Contrast | Variation Value of Color Info | Variation Value of Brightness | Elapsed Time |
|---|---|---|---|---|---|
| 100 | 0 or More | 0 or More | 0 or More | 24 or More | 0 or More |
|  | 0 or More | 0 or More | 0 or More | 0 or More | 10 Hr. or Longer |
|  | 30 or More | 1 or More, but less than 2 | 0 or More, but less than 1 | 12 or More | 20 Sec. or Longer |
| 80 | 0 or More | 0 or More | 0 or More | 18 or More, but less than 24 | 0 or More |
|  | 0 or More | 0 or More | 0 or More | 0 or More | 10 Min. or Longer, but Shorter than 10 Hr. |
|  | 20 or More, but less than 30 | 2 or More | 2 or More | 12 or More | 20 Sec. or Longer |
| 60 | 0 or More | 0 or More | 0 or More | 12 or More, but less than 18 | 0 or More |
|  | 0 or More | 0 or More | 0 or More | 0 or More | 3 Min. or Longer, but Shorter than 10 Min. |
|  | 15 or More, but less than 20 | 1 or More, but less than 2 | 1 or More, but less than 2 | 6 or More, but less than 12 | 10 Sec. or Longer, but Shorter than 20 Sec. |
| 40 | 0 or More | 0 or More | 0 or More | 9 or More, but less than 12 | 0 or More |
|  | 0 or More | 0 or More | 0 or More | 0 or More | 30 Sec. or Longer, but Shorter than 3 Min. |
|  | 15 or More, but less than 20 | 0 or More, but less than 1 | 0 or More, but less than 1 | 4 or More, but less than 6 | 8 Sec. or Longer, but Shorter than 10 Sec. |
| 20 | 0 or More | 0 or More | 0 or More | 6 or More, but less than 9 | 0 or More |
|  | 0 or More | 0 or More | 0 or More | 0 or More | 10 Sec. or Longer, but Shorter than 30 Sec. |
|  | 15 or More, but less than 20 | 0 or More, but less than 1 | 0 or More, but less than 1 | 4 or More, but less than 6 | 6 Sec. or Longer, but Shorter than 8 Sec. |
| 0 | 0 or More | 0 or More | 0 or More | less than 6 | 0 or More |
|  | 0 or More | 0 or More | 0 or More | 0 or More | Shorter than 10 Sec. |
|  | less than 15 | 0 or More, but less than 1 | 0 or More, but less than 1 | less than 4 | Shorter than 6 Sec. |

FIG.4

| Contrast Weighting Rate | Variation Value of Color Temp. | Variation Value of Contrast | Variation Value of Color Info | Variation Value of Brightness | Elapsed Time |
|---|---|---|---|---|---|
| 100 | 0 or More | 0 or More | 0 or More | 24 or More | 0 or More |
| | 0 or More | 0 or More | 0 or More | 0 or More | 10 Hr. or Longer |
| | 20 or More | 4 or More | 0 or More, but less than 1 | 12 or More | 20 Sec. or Longer |
| 80 | 0 or More | 0 or More | 0 or More | 18 or More, but less than 24 | 0 or More |
| | 0 or More | 0 or More | 0 or More | 0 or More | 10 Min. or Longer, but Shorter than 10 Hr. |
| | 12 or More, but less than 20 | 3 or More, but less than 4 | 2 or More | 12 or More | 20 Sec. or Longer |
| 60 | 0 or More | 0 or More | 0 or More | 12 or More, but less than 18 | 0 or More |
| | 0 or More | 0 or More | 0 or More | 0 or More | 3 Min. or Longer, but Shorter than 10 Min. |
| | 12 or More, but less than 20 | 2 or More, but less than 3 | 1 or More, but less than 2 | 6 or More, but less than 12 | 10 Sec. or Longer, but Shorter than 20 Sec. |
| 40 | 0 or More | 0 or More | 0 or More | 9 or More, but less than 12 | 0 or More |
| | 0 or More | 0 or More | 0 or More | 0 or More | 30 Sec. or Longer, but Shorter than 3 Min. |
| | 8 or More, but less than 12 | 2 or More, but less than 3 | 0 or More, but less than 1 | 4 or More, but less than 6 | 8 Sec. or Longer, but Shorter than 10 Sec. |
| 20 | 0 or More | 0 or More | 0 or More | 6 or More, but less than 9 | 0 or More |
| | 0 or More | 0 or More | 0 or More | 0 or More | 10 Sec. or Longer, but Shorter than 30 Sec. |
| | 8 or More, but less than 12 | 1 or More, but less than 2 | 0 or More, but less than 1 | 4 or More, but less than 6 | 6 Sec. or Longer, but Shorter than 8 Sec. |
| 0 | 0 or More | 0 or More | 0 or More | less than 6 | 0 or More |
| | 0 or More | 0 or More | 0 or More | 0 or More | Shorter than 10 Sec. |
| | less than 8 | 0 or More, but less than 1 | 0 or More, but less than 1 | less than 4 | Shorter than 6 Sec. |

FIG.5

| Color Info Weighting Rate | Variation Value of Color Temp. | Variation Value of Contrast | Variation Value of Color Info | Variation Value of Brightness | Elapsed Time |
|---|---|---|---|---|---|
| 100 | 0 or More | 0 or More | 0 or More | 24 or More | 0 or More |
| | 0 or More | 0 or More | 0 or More | 0 or More | 10 Hr. or Longer |
| | 20 or More | 4 or More | 0 or More, but less than 3 | 12 or More | 20 Sec. or Longer |
| 80 | 0 or More | 0 or More | 0 or More | 18 or More, but less than 24 | 0 or More |
| | 0 or More | 0 or More | 0 or More | 0 or More | 10 Min. or Longer, but Shorter than 10 Hr. |
| | 12 or More, but less than 20 | 3 or More, but less than 4 | 6 or More | 12 or More | 20 Sec. or Longer |
| 60 | 0 or More | 0 or More | 0 or More | 12 or More, but less than 18 | 0 or More |
| | 0 or More | 0 or More | 0 or More | 0 or More | 3 Min. or Longer, but Shorter than 10 Min. |
| | 12 or More, but less than 20 | 2 or More, but less than 3 | 6 or More | 6 or More, but less than 12 | 10 Sec. or Longer, but Shorter than 20 Sec. |
| 40 | 0 or More | 0 or More | 0 or More | 9 or More, but less than 12 | 0 or More |
| | 0 or More | 0 or More | 0 or More | 0 or More | 30 Sec. or Longer, but Shorter than 3 Min. |
| | 8 or More, but less than 12 | 2 or More, but less than 3 | 4 or More, but less than 6 | 4 or More, but less than 6 | 8 Sec. or Longer, but Shorter than 10 Sec. |
| 20 | 0 or More | 0 or More | 0 or More | 6 or More, but less than 9 | 0 or More |
| | 0 or More | 0 or More | 0 or More | 0 or More | 10 Sec. or Longer, but Shorter than 30 Sec. |
| | 8 or More, but less than 12 | 1 or More, but less than 2 | 3 or More, but less than 4 | 4 or More, but less than 6 | 6 Sec. or Longer, but Shorter than 8 Sec. |
| 0 | 0 or More | 0 or More | 0 or More | less than 6 | 0 or More |
| | 0 or More | 0 or More | 0 or More | 0 or More | Shorter than 10 Sec. |
| | less than 8 | 0 or More, but less than 1 | 0 or More, but less than 3 | less than 4 | Shorter than 6 Sec. |

| Brightness Weighting Rate | Variation Value of Color Temp. | Variation Value of Contrast | Variation Value of Color Info | Variation Value of Brightness | Elapsed Time |
|---|---|---|---|---|---|
| 100 | 0 or More | 0 or More | 0 or More | 12 or More | 0 or More |
| | 0 or More | 0 or More | 0 or More | 0 or More | 10 Hr. or Longer |
| | 30 or More | 1 or More, but less than 2 | 0 or More, but less than 1 | 12 or More | 20 Sec. or Longer |
| 80 | 0 or More | 0 or More | 0 or More | 8 or More, but less than 12 | 0 or More |
| | 0 or More | 0 or More | 0 or More | 0 or More | 10 Min. or Longer, but Shorter than 10 Hr. |
| | 20 or More, but less than 30 | 2 or More | 2 or More | 12 or More | 20 Sec. or Longer |
| 60 | 0 or More | 0 or More | 0 or More | 4 or More, but less than 8 | 0 or More |
| | 0 or More | 0 or More | 0 or More | 0 or More | 3 Min. or Longer, but Shorter than 10 Min. |
| | 15 or More, but less than 20 | 1 or More, but less than 2 | 1 or More, but less than 2 | 6 or More, but less than 12 | 10 Sec. or Longer, but Shorter than 20 Sec. |
| 40 | 0 or More | 0 or More | 0 or More | 4 or More, but less than 8 | 0 or More |
| | 0 or More | 0 or More | 0 or More | 0 or More | 30 Sec. or Longer, but Shorter than 3 Min. |
| | 15 or More, but less than 20 | 0 or More, but less than 1 | 0 or More, but less than 1 | 4 or More, but less than 6 | 5 Sec. or Longer, but Shorter than 10 Sec. |
| 20 | 0 or More | 0 or More | 0 or More | 4 or More, but less than 8 | 0 or More |
| | 0 or More | 0 or More | 0 or More | 0 or More | 10 Sec. or Longer, but Shorter than 30 Sec. |
| | 2 or More, but less than 15 | 0 or More, but less than 1 | 0 or More, but less than 1 | 2 or More, but less than 4 | 3 Sec. or Longer, but Shorter than 5 Sec. |
| 0 | 0 or More | 0 or More | 0 or More | less than 6 | 0 or More |
| | 0 or More | 0 or More | 0 or More | 0 or More | Shorter than 10 Sec. |
| | less than 2 | 0 or More, but less than 1 | 0 or More, but less than 1 | less than 2 | Shorter than 3 Sec. |

ELECTRONIC CAMERA CAPABLE OF HAVING RESULTS OF PREVIOUS IMAGE PICKUP PROCESSING REFLECTED IN CURRENT IMAGE PICKUP PROCESSING

CROSS REFERENCE TO RELATED APPLICATION

The disclosure of the following priority application is herein incorporated by reference: Japanese Patent Application No. 2002-025712, filed Feb. 1, 2002.

BACKGROUND OF THE INVENTION

1. Field of the Invention

The present invention relates to electronic cameras that perform image pickup processings, specifically, correction processings on image data, and exposure control at the time of photographing.

2. Description of the Related Art

A typical electronic camera performs a variety of correction processings such as white balance adjustment, gray level correction, color correction on image data outputted from the image sensor, in order to obtain an image adapted to the various conditions of a subject (for example, a light source illuminating the subject, contrast and so on), Some conventional electronic camera includes a color temperature determining part that determines the color temperature of a light source illuminating a subject. Such electronic camera achieves a white balance adjustment (in some instances, color correction) using the determined color temperature as a control parameter.

Also, another conventional electronic camera includes a contrast determining part that determines the contrast of a subject, and implements a gray level correction using the determined contrast as a control parameter.

These electronic cameras determine the latest color temperature and contrast of an image at the time when the release button is pressed down or immediately before that. Conventionally, the correction processings are implemented according to the latest color temperature and contrast. In such a case, when conditions of a subject vary during continuous shooting, the correction processings are performed in accordance with the variations of the subject.

However, there is a case where the position of the subject shifts even during the continuous shooting of the same subject, resulting in causing the color temperature determined by the electronic camera to vary. This causes a problem that the white balance of the same subject varies among a plurality of images. If these images are sequentially reproduced, the user may feel the images very unnatural.

Especially, a subject having a red color is very susceptible to the white balance adjustment. Therefore, the above problem is significant when a red moving car, for example, is continuously shot within an angle of field. Similar problems occur not only in performing the white balance adjustment but also in the gray level correction and color correction.

In order to obtain stable results of the correction processings, some conventional methods have been contrived which limits the variation values of control parameters within a predetermined range.

However, such methods are disadvantageous in that when the conditions of a subject distinctively change, for example, when a car is moving from a sunny place to a shady place or vise versa, it is very hard to perform the correction processings in accordance with such variations.

Some electronic cameras each perform exposure controls (including gain adjustment to analog image signals) with a high adaptability, based on the brightness repetitively determined by a photometric sensor or the like. Such electronic cameras, however, disadvantageously perform exposure control in accordance with such a variation even in the case where the conditions of a subject temporarily vary irrespective of the user's intention during a course of his/her continuous shooting of the same subject.

As explained above, there have been unsolved problems in the conventional image pickup processings (particularly, correction processings and exposure controls) that enhancing the stability of the processings will degrade adaptability thereof, while enhancing the adaptability will degrade the stability.

SUMMARY OF THE INVENTION

In order to solve the above-described problems, it is an object of the present invention to provide an electronic camera capable of performing the image pickup processings with both stability and adaptability at the same time.

The present invention will now be described below.

(1) An electronic camera according to the present invention includes an imaging part, a conditional information determining part, a storage part and a correction processing part. The imaging part images a subject to produce image data. The conditional information determining part determines conditional information that is indicative of the conditions of the subject at the time when the imaging part images the subject. The storage part stores previous conditional information determined by the conditional information determining part. The correction processing part performs correction processing on the image data, based on both the previous conditional information stored in the storage part and current conditional information determined by the conditional information determining part.

(2) More preferably, the conditional information determining part determines at least color temperature as the conditional information when the correction processing part performs a white balance adjustment or a color correction.

Also preferably, the conditional information determining part determines at least contrast as the conditional information when the correction processing part performs a gray level correction.

Also preferably, the conditional information determining part produces color information quantitatively indicative of a major color within an angle of field, when the correction processing part performs a color correction.

(3) More preferably, the correction processing part has a control parameter calculating part that calculates a control parameter, which is used for the correction processings on the image data each time the imaging part produces the image data. The storage part stores the previous control parameter calculated by the control parameter calculating part. The control parameter calculating part calculates a new control parameter in accordance with a difference between the previous and current conditional information by combining the previous control parameter stored in the storage part with the control parameter obtained based on the current conditional information.

(4) More preferably, the conditional information includes the brightness of the subject. In such case, when the variation amount of the brightness is equal to or greater than an upper limit value, the control parameter calculating part determines, as the new control parameter, the control parameter obtained based on the current conditional information.

When the variation amount of the brightness is less than a lower limit value, the control parameter calculating part determines the previous control parameter as the new control parameter.

(5) More preferably, the electronic camera according to the present invention further includes an image pickup time obtaining part for obtaining image pickup time each time the imaging part produces the image data. The correction processing part has a control parameter calculating part that calculates a control parameter, which is used for the correction processings on the image data each time the imaging part produces the image data. The storage part stores the previous control parameters calculated by the control parameter calculating part.

In such case, when an elapsed length of time from the previous image pickup to the present image pickup is equal to or greater than an upper limit value, the control parameter calculating part determines, as the new control parameter, the control parameter obtained based on the current conditional information.

When the elapsed length of time is less than a lower limit value, the control parameter calculating part determines the previous control parameter stored in the storage part as the new control parameter.

(6) More preferably, the electronic camera according to the present invention has an electric flash for emitting light built in or mounted thereon as an accessory. The correction processing part has a control parameter calculating part that calculates a control parameter, which is used for the correction processings on the image data, each time the imaging part produces the image data. The storage part stores the previous control parameters calculated by the control parameter calculating part.

In the case where presence to absence of the emission from the electric flash changes between the previous image pickup and the present image pickup, the control parameter calculating part determines, as the new control parameter, the control parameter obtained based on the current conditional information.

When presence to absence of the emission from the electric flash does not change between the previous image pickup and the present image pickup, the control parameter calculating part determines the previous control parameters stored in the storage part as the new control parameter.

(7) More preferably, the control parameter calculating part initializes the previous control parameter and the value of previous conditional information stored in the storage part-when presence to absence of the emission from the electric flash changes between the previous image pickup and the present image pickup.

(8) Another electronic camera according to the present invention includes an imaging part, a conditional information determining part, a storage part, a control parameter calculating part and an exposure control part as follows.

The imaging part images a subject to produce image data. The conditional information determining part repetitively determines conditional information indicative of the conditions of the subject. The storage part stores previous conditional information determined by the conditional information determining part. The control parameter calculating part repetitively calculates, based on both the previous conditional information stored in the storage part and current conditional information determined by the conditional information determining part, the control parameter to be used for an exposure control at the time when the imaging part produces the image data. The exposure control part performs the exposure control by use of the control parameter calculated immediately before the imaging part produces the image data.

(9) Another electronic camera according to the present invention includes an imaging part, a conditional information determining part, a storage part, a control parameter calculating part and a correction processing part as follows.

The imaging part images a subject to produce image data. The conditional information determining part repetitively determines conditional information indicative of the conditions of the subject. The storage part stores previous conditional information determined by the conditional information determining part. The control parameter calculating part repetitively calculates, based on both the previous conditional information stored in the storage part and current conditional information determined by the conditional information determining part, the control parameter to be used for correction processings on the image data produced by the imaging part. The correction processing part performs the correction processings by use of the control parameter calculated immediately before the imaging part produces the image data.

(10) More preferably, the conditional information determining part determines at least color temperature as the conditional information when the correction processing part performs a white balance adjustment or a color correction.

Also preferably, the conditional information determining part determines at least contrast as the conditional information when the correction processing part performs a gray level correction.

Also preferably, the conditional information determining part generates color information quantitatively indicative of a major color within an angle of field, when the correction processing part performs a color correction.

(11) More preferably, the storage part stores the previous control parameter calculated by the control parameter calculating part. In this case, the control parameter calculating part calculates a new control parameter in accordance with a difference between the previous and current conditional information by combining the previous control parameter stored in the storage part with the control parameter obtained based on the current conditional information.

(12) More preferably, the conditional information includes the brightness of the subject. When the variation amount of the brightness is equal to or greater than an upper limit value, the control parameter calculating part determines, as the new control parameter, the control parameter obtained based on the current conditional information.

When the variation amount of the brightness is less than a lower limit value, the control parameter calculating part determines the previous control parameter as the new control parameter.

(13) More preferably, the electronic camera according to the present invention includes an image pickup time obtaining part for obtaining image pickup time each time the imaging part produces image data. The storage part stores the previous control parameter calculated by the control parameter calculating part.

When an elapsed length of time from the previous image pickup to the present image pickup is equal to or greater than an upper limit value, the control parameter calculating part determines, as the new control parameter, the control parameter obtained based on the current conditional information.

When the elapsed length of time is less than a lower limit value, the control parameter calculating part determines the previous control parameter stored in the storage part as the new control parameter.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 3 is a diagram showing an example of an LUT referred to when the color temperature weighting rate is decided;

FIG. 4 is a diagram showing an example of an LUT referred to when the contrast weighting rate is decided;

FIG. 5 is a diagram showing an example of an LUT referred to when the color information weighting rate is decided;

FIG. 7 is a diagram showing an example of an LUT referred to when the brightness weighting rate is decided.

DETAILED DESCRIPTION OF THE PREFERRED EMBODIMENTS

Embodiments of the present invention will be described below in detail with reference to the drawings.

FIRST EMBODIMENT

Figure 1:
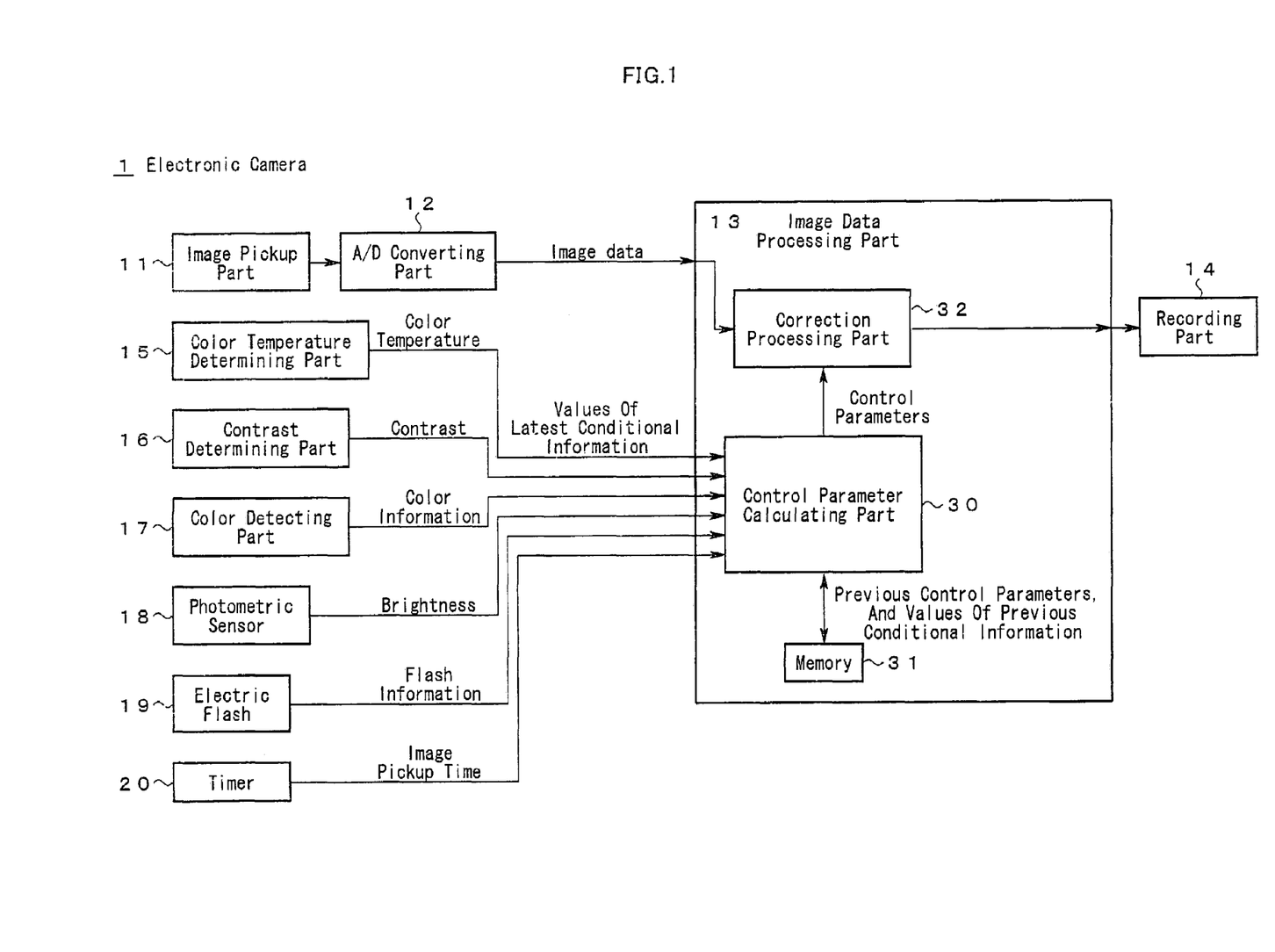
FIG. 1 is a block diagram showing the functions of an electronic camera of a first embodiment according to the present invention.

FIG. 1 is a block diagram showing the functions of a first embodiment of the present invention. In FIG. 1, an electronic camera 1 includes constituent elements as follows:

(1) an image pickup part 11 that includes a shooting optical system, a diaphragm, an image sensor and so on and produces image data of a subject;

(2) an A/D converting part 12 that digitalizes the image data produced by the image pickup part 11;

(3) an image data processing part 13 that performs a variety of correction processings such as white balance adjustment, gray level correction, color correction on the digitalized image data;

(4) a recording part 14 that compresses the image data subjected to the foregoing variety of correction processings to record them on a predetermined recording medium;

(5) a color temperature determining part 15 that determines color temperature.

(6) a contrast determining part 16 that determines contrast;

(7) a color detecting part 17 that generates color information quantitatively indicative of major colors within an angle of field;

(8) a photometric sensor 18 that determines brightness;

(9) an electric flash 19 that emits light to illuminate a subject; and (10) a timer 20 that clocks image pickup time and so on.

The foregoing image data processing part 13 includes constituent elements as follows:

(11) a control parameter calculating part 30 that calculates control parameters for deciding the degrees of the correction processings and the like;

(12) a memory 31 that stores therein control parameters which the control parameter calculating part 30 calculates at the time of previous image pickup (to be referred to as "previous control parameters" hereinafter) and that also stores values of previous conditional information (will be described later in detail) and so on; and (13) a correction processing part 32 that performs the various correction processings on the image data by use of the control parameters calculated anew by the control parameter calculating part 30.

The control parameter calculating part 30 receives outputs from the color temperature determining part 15, contrast determining part 16, color detecting part 17 and photometric sensor 18. The control parameter calculating part 30 also receives information indicative of whether the electric flash 19 emits light or not (to be referred to as "flash information" hereinafter), and also receives the image pickup times clocked by the timer 20.

The electronic camera 1 constructed as described above operates similarly to the conventional electronic cameras except for the operation of the control parameter calculating part 30 and except that color information is used as the control parameter for color correction. The first embodiment is characterized not by how to perform the color correction but by how to calculate control parameters for achieving the various correction processings. For simplicity the descriptions on the operations will be omitted except for the operation of the control parameter calculating part 30.

Figure 2:
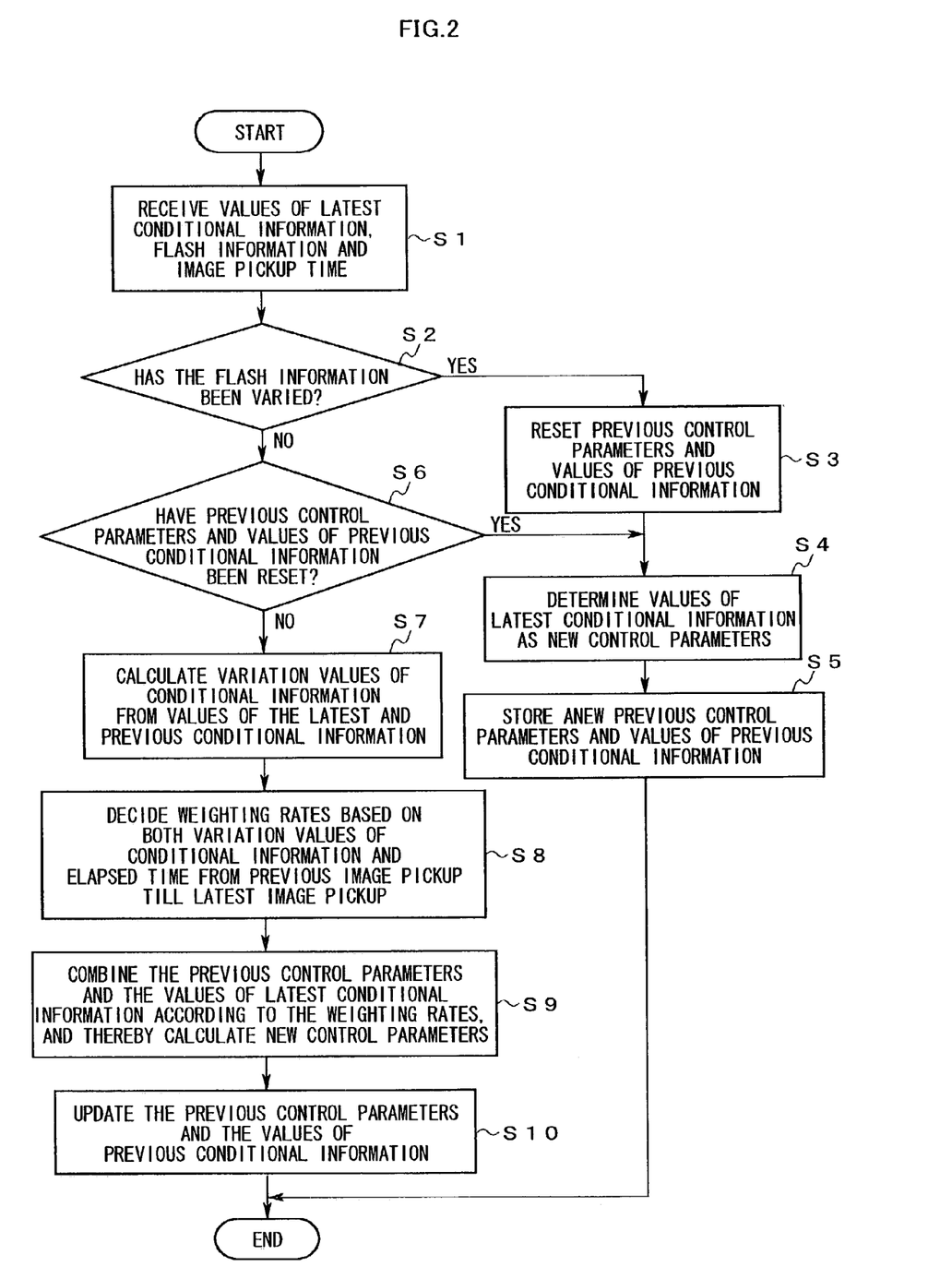
FIG. 2 is a flowchart showing the operation of a control parameter calculating part in the first embodiment.

FIG. 2 is a flowchart showing the operation of the control parameter calculating part 30 in the first embodiment, and particularly, showing the operation thereof during the time when the release button is pressed down for an image pickup.

The operation of the control parameter calculating part 30 will now be described below with reference to FIG. 2.

Each time an image pickup is performed, the control parameter calculating part 30 receives a value of the latest conditional information, the flash information and the image pickup time (S1 of FIG. 2).

The values of latest conditional information herein refer to values of the color temperature, contrast, color information and brightness at the time of the latest image pickup. According to the present embodiment, the conditional information is standardized so as to adapt to the control parameters for the image pickup processings. Especially, values of the color information are calculated according to color differences in an angle of field, and the values are standardized values 1 through 15 that correspond to the major colors within the angle of field.

On the other hand, the values of the previous conditional information refer to values of the color temperature, contrast, color information and brightness obtained at the time of previous image pickup, and the control parameter calculating part 30 stores them in the memory 31 in association with image pickup times.

According to the first embodiment, values of the conditional information obtained at three previous image pickups are stored in the memory 31. The flash information obtained at the previous image pickup is also stored in the memory 31.

Next, the control parameter calculating part 30 determines whether the flash information has been varied or not (S2 of FIG. 2). Such determination can be achieved by comparing the flash information obtained at the previous image pickup in the memory 31 with that at the latest image pickup.

When determining that the flash information has been varied, the control parameter calculating part 30 resets the previous control parameters and the values of the previous conditional information stored in the memory 31 (S3 of FIG. 2), and determines the values of the latest conditional information (except brightness) as new control parameters (S4 of FIG. 2). Additionally, the control parameter calculating part 30 stores anew the previous control parameters and the values of previous conditional information (S5 of FIG. 2).

That is, when the flash information has been varied, the control parameter calculating part 30 recognizes the electric flash 19's changing from ON state to OFF state or vice versa, and determines that the conditions of the subject have actually changed. Then, the control parameter calculating part 30 determines the latest color temperature as the control parameter for the white balance adjustment, the latest contrast as the control parameter for the gray level correction, and the latest color information as the control parameter for the color correction such that the correction processing part 32 can perform correction processings in accordance with the changes in the conditions of the subject. Additionally, the control parameter calculating part 30 stores anew the previous control parameters and the values of previous conditional information in preparation for the next image pickup.

This storing of the previous control parameters and the values of previous conditional information signifies that the new control parameters are stored as previous control parameters or the values of the latest conditional information as values of the first previous conditional information in the memory 31. However, the values of a plurality of previous conditional information are averaged in processings that will be described later, and hence in the storing of the previous values, every set of values of the latest conditional information has to be stored in the memory 31 as the values of all previous conditional information so as to prepare for the processings.

On the other hand, when the flash information has not been varied, the control parameter calculating part 30 determines whether the previous control parameters and the values of previous conditional information have been reset or not (S6 of FIG. 2).

When the previous control parameters and the values of previous conditional information have been reset, the control parameter calculating part 30 determines the values of the latest conditional information (except the brightness) as new control parameters (S4 of FIG. 2) and stores anew the previous control parameters and the values of previous conditional information (S5 of FIG. 2).

That is, when the flash information has not been varied and the previous control parameters and the values of previous conditional information have been reset, the control parameter calculating part 30 judges that for some reason (for example, because of an initialization for shipping, an initialization associated with a set operation of the timer 20, or the like), the previous control parameters and the values of previous conditional information have been reset. Then, the control parameter calculating part 30 determines the color temperature, contrast and color information, received as the values of the latest conditional information, as control parameters for the respective correction processings such that the correction processing part 32 can perform correction processings in accordance with the current conditions of the subject. Additionally, the control parameter calculating part 30 stores anew the previous control parameters and the values of previous conditional information in preparation for the next image pickup.

On the other hand, when the previous control parameters and the values of previous conditional information have not been reset, the control parameter calculating part 30 calculates variation values of conditional information based on the latest values of previous conditional information (S7 of FIG. 2).

An example will be described below in which variation values of the color temperature, contrast, color information and brightness are calculated as the variation values of conditional information It should be noted that in the first embodiment the degree of color information is expressed by values 1 through 15 for convenience, however, the values 1 and 15 are next to each other with regard to degrees of color. Therefore, there will be described in the following an example where the variation value of the color information is calculated in a slightly different manner from that in which the variation values of the other information are calculated.

In addition, in the example below, the times at which three previous images are picked up will be represented by TIME(1), TIME(2) and TIME(3), respectively, and the time at which the latest image pickup is performed will be represented by TIME(0), for simplicity. Similarly, the color temperatures obtained at the previous and latest image pickups will be represented by PK(1), PK(2), PK(3) and PK(0), respectively; the contrasts obtained at the previous and latest image pickups will be represented by PCN(1), PCN(2), PCN(3) and PCN(0), respectively; the color information obtained at the previous and latest image pickups will be represented by PC(1), PC(2), PC(3) and PC(0), respectively; and the brightness obtained at the previous and latest image pickups will be represented by PLA(1), PLA(2), PLA(3) and PLA(0), respectively. Additionally, a fixed length of time in which intervals of image pickups are evaluated will be represented by TH.

When a Condition 1 indicated below is satisfied, the control parameter calculating part 30 calculates the variation values of the color temperature, contrast, color information and brightness by use of following Equations 1 to 4.

$$\text{TIME}(0) - \text{TIME}(3) < \text{TH} \quad \text{Condition 1}$$

$$\text{Variation value of color temperature} = |(PK(1) + PK(2) + PK(3))/3 - PK(0)| \quad \text{Equation 1}$$

$$\text{Variation value of contrast} = |(PCN(1) + PCN(2) + PCN(3))/3 - PCN(0)| \quad \text{Equation 2}$$

$$\text{Variation value of color information} = (\text{color variation value 1} + \text{color variation value 2} + \text{color variation value 3})/3 \quad \text{Equation 3}$$

$$\text{Variation value of brightness} = |(PLA(1) + PLA(2) + PLA(3))/3 - PLA(0)| \quad \text{Equation 4}$$

As to the Equation 3, the color variation values 1, 2 and 3 are calculated by Equations 5 to 7 indicated below, and if any one of them is greater than 8, it will be converted to its complement. Thus, the variation values of color information calculated by use of such values are expressed by values 0 through 8.

$$\text{Color variation value 1} = |(PC(1) - PC(0)| \quad \text{Equation 5}$$

$$\text{Color variation value 2} = |(PC(2) - PC(0)| \quad \text{Equation 6}$$

$$\text{Color variation value 3} = |(PC(3) - PC(0)| \quad \text{Equation 7}$$

When a Condition 2 indicated below is satisfied, the control parameter calculating part 30 calculates the variation values of the color temperature, contrast, color information and brightness by use of following Equations 8 to 11.

$$\text{TIME}(0) - \text{TIME}(2) < \text{TH} \quad \text{Condition 2}$$

Variation value of color temperature=|(PK(1)+PK(2))/2−PK(0)|  Equation 8

Variation value of contrast=|(PCN(1)+PCN(2))/2−PCN(0)|  Equation 9

Variation value of color information=(color variation value 1+color variation value 2)/2  Equation 10

Variation value of brightness=|(PLA(1)+PLA(2))/2−PLA(0)|  Equation 11

As to the Equation 10, the color variation values 1 and 2 are calculated by the foregoing Equations 5 and 6, and if any one of them is greater than 8, it will be converted to its complement.

When neither of the foregoing Conditions 1 and 2 is satisfied, the control parameter calculating part 30 calculates the variation values of the color temperature, contrast, color information and brightness by use of following Equations 12 to 15.

Variation value of color temperature=|PK(1)−PK(0)|  Equation 12

Variation value of contrast=|PCN(1)−PCN(0)|  Equation 13

Variation value of color information=color variation value 1  Equation 14

Variation value of brightness=|PLA(1)−PLA(0)|  Equation 15

As to the Equation 14, the color variation value 1 is calculated by the foregoing Equation 5, and if it is greater than 8, it will be converted to its complement.

As described above, when three or more image pickups including the latest are performed within a certain period of time, the control parameter calculating part 30 averages the values of previous conditional information obtained at the image pickups within the period. Then, the control parameter calculating part 30 obtains the differences (absolute values) between the averaged values and the values of the latest conditional information as the variation values of conditional information. If less than three image pickups are performed within the certain period of time, the control parameter calculating part 30 obtains the differences (absolute values) between the values of the first previous conditional information and the values of the latest conditional information as the variation values of conditional information.

That is, if the image pickup operation is repetitively performed within a short period of time, the second and third previous conditional information in addition to the first previous is used to calculate the variation values of conditional information, whereby the variation values of conditional information can be stabilized.

Next, the control parameter calculating part 30 decides weighting rate based on both the variation values of conditional information and an elapsed period of time from the previous image pickup to the latest image pickup (S8 of FIG. 2).

The "weighting rate" referred to herein is a rate in which the previous control parameters and the values of the latest conditional information (except the brightness) are combined. The weighting rate is decided for every control parameter associated with the various correction processings of the correction processing part 32.

That is, the weighting rate includes the following three.

(1) Color temperature weighting rate: a weighting rate of the latest color temperature used to calculate the control parameter for the white balance adjustment.

(2) Contrast weighting rate: a weighting rate of the latest contrast used to calculate the control parameter for the gray level correction.

(3) Color information weighting rate: a weighting rate of the latest color information used to calculate the control parameter for the color correction.

The control parameter calculating part 30 stores therein LUTs (Look Up Tables) in which the weighting rate is associated with both the variation values of conditional information and the elapsed period of time from the previous image pickup till the latest image pickup. Image pickup tests are repetitively conducted to appropriately set data of the LUTs. The control parameter calculating part 30 decides the weighting rate with reference to the LUTs.

FIGS. 3, 4 and 5 are diagrams showing examples of LUTs that are referred to when the color temperature, contrast and color information weighting rates are decided, respectively. The LUTs are referred to in order, starting from the top to the bottom. That is, if respective values satisfy the conditions determined in the uppermost part of the LUT, for example, the weighting rate 100 will be applied, and if they do not, the second uppermost part thereof is referred to. When respective values satisfy the conditions therein, weighting rate 80 will be applied, and if they do not, the third uppermost part thereof is referred to. In other words, a weighting rate will be selected corresponding to conditions which are first satisfied.

In FIGS. 3, 4 and 5, the variation values of color information have been standardized to values 0 through 8, as previously stated. The variation values of color temperature are standardized to values 0 through 255. The variation values of contrast are standardized to values 0 through 6. The variation values of brightness are standardized to values 0 through 255.

According to the LUTs of FIG. 3, 4 and 5, the color temperature, contrast and color information weighting rates, respectively, are 100 percent on occasions when the variation value of brightness is large, when the elapsed time from the previous image pickup till the latest image pickup is long, or when the variation values of conditional information are greater than predetermined values. On these occasions it is highly likely that the conditions of the subject have actually varied, and hence correction processing is performed preferably in accordance with the variations in the conditions.

On the other hand, the color temperature, contrast and color information weighting rates are zero percent on occasions when the brightness varies little, when the elapsed time from the previous image pickup till the latest image pickup is very short, or when the variation values of conditional information are very small. On these occasions it is highly likely that the same subject is being continuously imaged, and hence correction processing of high stability is preferably performed.

In intermediate situations between the above two cases, the variation value of the brightness, the elapsed period of time from the previous image pickup till the latest image pickup, and the variation values of all conditional information are evaluated in steps. According to the evaluation result, the brightness weighting rate, contrast weighting rate, and color information weighting rate will be within a range between 20 and 80 percent (both inclusive).

Next, the control parameter calculating part 30 combines the previous control parameters and the values of the latest conditional information (except the brightness) according to the weighting rates decided as described above, thereby calculating new control parameters (S9 of FIG. 2).

That is, when the weighting rates of the color temperature, contrast and color information are 100 percent, the color temperature, contrast and color information obtained as the values of the latest conditional information are determined as new control parameters. On the other hand, when the weighting rates of the color temperature, contrast and color information are zero percent, the previous control parameters are determined as new control parameters.

When the weighting rates of the color temperature, contrast and color information are between 20 and 80 percent (both inclusive), the color temperature, contrast and color information obtained as the values of the latest conditional information are properly combined with the previous control parameters, thereby calculating new control parameters.

Then, the control parameter calculating part 30 prepares for a next image pickup, updating the previous control parameters and the values of previous conditional information (S10 of FIG. 2). That is, the control parameter calculating part 30 determines the previous control parameters as the new control parameters, and updates the values of previous conditional information such that the first previous conditional information become the second previous, the second become the third previous, the latest conditional information become the first previous.

As described above, according to the first embodiment, the new control parameters, which are used in the correction processings on the image data produced at the latest image pickup, are calculated by combining the previous control parameters with the values of the latest conditional information in accordance with the variation values of conditional information. The weighting rates decided as described above are used for the combining, such that the higher the necessity of performing correction processings in accordance with conditional variations, the higher the weighting rate of the latest conditional information, and the higher the necessity of performing stable correction processings, the higher the weighting rate of previous control parameters. Thus, the correction processings according to the first embodiment are performed with adaptability or stability depending on actual conditions.

Also according to the first embodiment, when the flash information has been varied, it is judged that the conditions of the subject have remarkably varied. In such a case, the values of the latest conditional information are used to calculate new control parameters, and the previous control parameters and the values of previous conditional information are reset. Thus, the values of previous conditional information prior to a variation in the flash information do not affect the control parameters to be calculated at the next image pickup. As a result, even when images are picked up with flash, the correction processings performed are with adaptability or stability depending on the conditions.

SECOND EMBODIMENT

A second embodiment of the present invention will now be described below.

The second embodiment is characterized by control parameters to be used for an exposure control which is performed in the image pickup part of an electronic camera when the release button is pressed down, and by the calculation of control parameters to be used for a variety of correction processings on digitized image data (e.g., white balance adjustment, gray level correction, color correction and so on). In the electronic camera 1 constructed as shown in FIG. 1, the control parameter calculating part 30 calculates such control parameters.

Then, parts of the second embodiment that are different from the first embodiment will now be described by use of the same reference labels as are shown in FIG. 1.

In the electronic camera 1, the control parameter calculating part 30 repetitively calculates control parameters at predetermined time intervals regardless of whether or not the release button is pressed down. The color temperature determining part 15, contrast determining part 16, color detecting part 17 and photometric sensor 18 repetitively determine the color temperature, contrast, color information and brightness in association with the calculations of the control parameters. Then, when the release button is pressed down, the image pickup part 11 performs an exposure control using the latest control parameters calculated immediately before the press-down. Similarly, the correction processing part 32 performs the various correction processings using the latest control parameters calculated immediately before the press-down.

In the second embodiment, the memory 31 stores therein, as values of previous conditional information, three previous determination results from the color temperature determining part 15, contrast determining part 16, color detecting part 17 and photometric sensor 18. The values of brightness which the photometric sensor 18 determines are standardized to values suitable for control parameters to be used for the exposure control.

Figure 6:
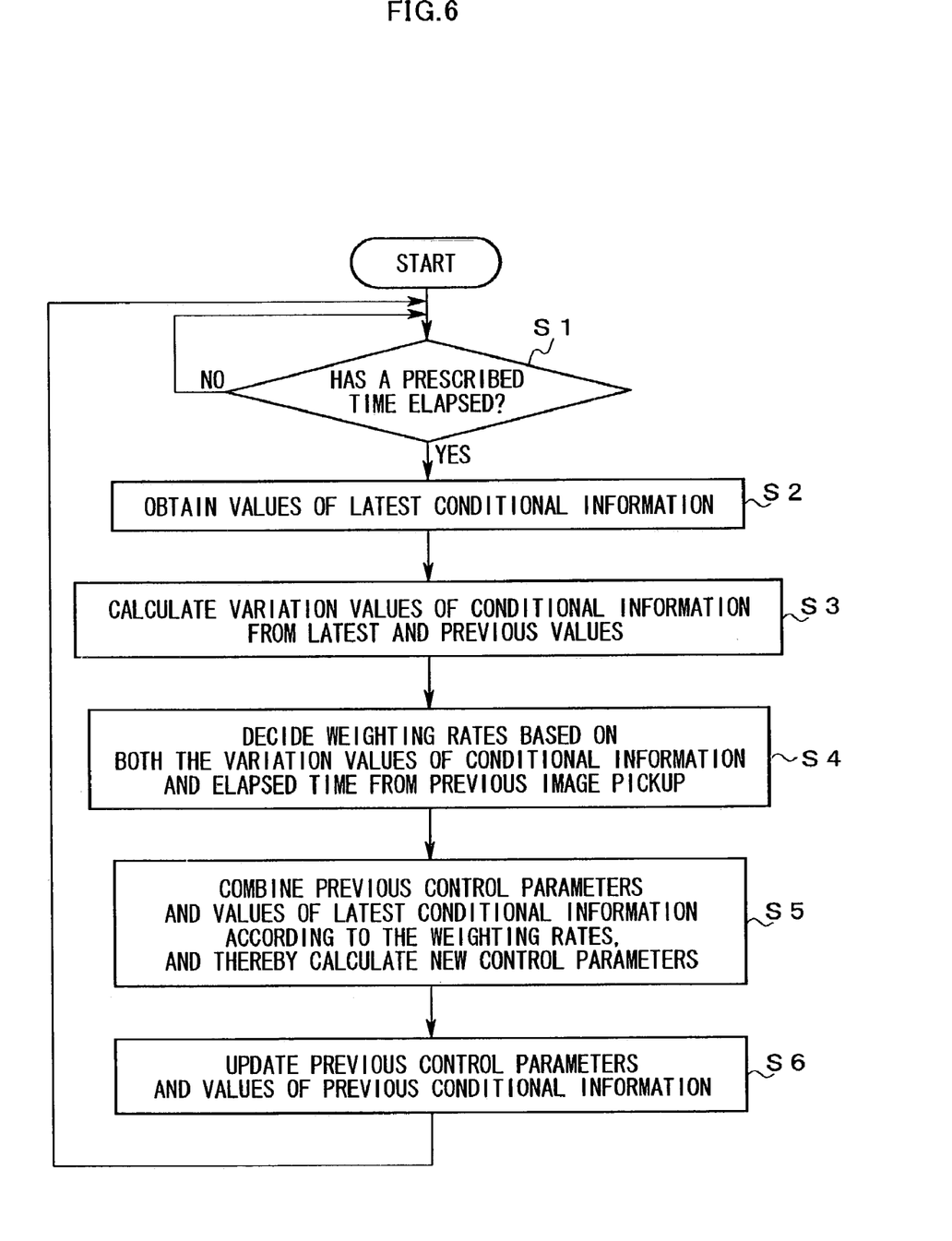
FIG. 6 is a flowchart showing the operation of a control parameter calculating part in a second embodiment.

FIG. 6 is a flowchart showing the operation of the control parameter calculating part 30 according to the second embodiment.

The operation of the control parameter calculating part 30 will now be described below with reference to FIG. 6.

The control parameter calculating part 30 repetitively determines whether a prescribed time (e.g., one second through two seconds) has elapsed or not (S1 of FIG. 6), and waits until the prescribed time elapses.

When the prescribed time has elapsed, the control parameter calculating part 30 obtains the values of the latest conditional information (S2 of FIG. 6). The control parameter calculating part 30 calculates the variation values of conditional information from the values of the latest and previous conditional information (S3 of FIG. 6). That is, the control parameter calculating part 30 averages the values of three previous conditional information stored in the memory 31, and then determines, as the variation values of conditional information, the absolute values of the differences between the resultant average values and the values of the latest conditional information.

Next, the control parameter calculating part 30 decides the weighting rates from both the variation values of conditional information and the elapsed time from the first previous image pickup time (S4 of FIG. 6).

The weighting rates include the color temperature, contrast, color information and brightness. The brightness weighting rate is a weighting rate of the latest brightness to be used at the calculation of the control parameters for an exposure control.

FIG. 7 is a diagram showing an example of the LUT to be referred to at the decision of the above brightness weighting rate.

The variation values in FIG. 7 are standardized similarly to those in FIGS. 3, 4 and 5.

According to the LUT of FIG. 7, the brightness weighting rate is 100 percent on occasions when the variation value of brightness is large, when the elapsed time from the previous to the latest image pickup is long, or when the variation values of conditional information are greater than predetermined values. On such occasion, it is very likely that the conditions of the subject have actually varied.

On the other hand, the brightness weighting rate is zero percent on occasions when the brightness varies little, when the elapsed time from the previous to the latest image pickup is very short, when the variation values of conditional information are very small. On such occasion, it is very likely that the same subject is being continuously imaged.

In intermediate conditions between the above two cases, the variation value of the brightness, the elapsed period of time from the previous image pickup till the latest image pickup, and the variation values of all conditional information are evaluated in steps. According to such evaluation results, the weighting rates of the color temperature, contrast and color information will be within a range between 20 and 80 percent (both inclusive).

Next, the control parameter calculating part 30 combines the previous control parameters and the values of the latest conditional information according to the weighting rates decided as described above, thereby calculating new control parameters (S5 of FIG. 6).

That is, when the weighting rate is 100 percent, the values of the latest conditional information are determined as the new control parameters. When the weighting rate is zero percent, the previous control parameters are determined as the new control parameters. When the weighting rate is between 20 and 80 percent (both inclusive), the values of the latest conditional information are properly combined with the previous control parameters, thereby calculating the new control parameters.

Then, the control parameter calculating part 30 updates the previous control parameters and the values of previous conditional information (S6 of FIG. 6). After this updating, the control parameter calculating part 30 repeats the processings of the steps S1 through S6 of FIG. 6.

According to the second embodiment as described above, the control parameters to be used for the exposure control and for the correction processings are repetitively calculated for preparation for a next image pickup. It should be noted that such control parameters are calculated by combining the previous control parameters and the values of the latest conditional information in accordance with the variation values of conditional information. In such combination, similarly to the first embodiment, the weighting rates are used such that the higher the necessity of performing correction processings in accordance with conditional variations, the higher the weighting rate of the latest conditional information, and the higher the necessity of performing stable correction processings, the higher the weighting rate of previous control parameters. Thus, the exposure control and the correction processings according to the second embodiment are performed with adaptability or stability depending on actual conditions.

The invention is not limited to the above embodiments and various modifications may be made without departing from the spirit and scope of the invention. Any improvement may be made in part or all of the components.

What is claimed is:

1. An electronic camera comprising:
    an imaging part for imaging a subject to produce image data;
    a conditional information determining part for determining conditional information, the conditional information being indicative of a condition of the subject at a time when said imaging part produces said image data;
    a storage part for storing previous conditional information determined by said conditional information determining part;
    a correction processing part for performing correction processing on said image data, according to both the previous conditional information stored in said storage part and current conditional information which is determined by said conditional information determining part when said imaging part produces said image data; and
    an image pickup time obtaining part for obtaining image pickup time every time said imaging part produces image data, wherein
        said correction processing part has a control parameter calculating part that calculates a control parameter every time said imaging part produces said image data, the control parameter being used for the correction processing on the image data;
        said storage part stores a previous control parameter calculated by said control parameter calculating part;
        when an elapsed length of time from previous image pickup time to present image pickup time is equal to or greater than an upper limit value, said control parameter calculating part determines the control parameter calculated according to the current conditional information as the new control parameter; and
    when the elapsed length of time is less than a lower limit value, said control parameter calculating part determines the previous control parameter stored in said storage part as the new control parameter.

2. The electronic camera according to claim 1, wherein:
    the conditional information determining part determines at least a color temperature of the subject; and
    the correction processing part calculates the control parameter based on the determined color temperature, and performs a white balance adjustment on the image data.

3. The electronic camera according to claim 1, wherein:
    the conditional information determining part determines at least a contrast of the subject; and
    the correction processing part calculates the control parameter based on the determined contrast, and performs a gray level correction on the image data.

4. The electronic camera according to claim 1, wherein:
    the conditional information determining part determines at least a color information of the subject; and
    the correction processing part calculates the control parameter based on the determined color information, and performs a color correction on the image data.

5. An electronic camera comprising:
    an imaging part for imaging a subject to produce image data;
    a conditional information determining part for repetitively determining conditional information which is indicative of a condition of the subject;
    a storage part for storing previous conditional information determined by said conditional information determining part;
    a control parameter calculating part for repetitively calculating a control parameter according to both the previous conditional information stored in said storage part and current conditional information determined by said conditional information determining part, the control parameter being used for an exposure control at a time when said imaging part produces the image data;

an exposure control part for performing the exposure control by use of the control parameter which is calculated immediately before said imaging part produces the image data; and an image pickup time obtaining part for obtaining image pickup time every time said imaging part produces image data, wherein said storage part stores a previous control parameter calculated by said control parameter calculating part;

when an elapsed length of time from previous image pickup time to present image pickup time is equal to or greater than an upper limit value, said control parameter calculating part determines the control parameter calculated according to the current conditional information as the new control parameter; and when the elapsed length of time is less than a lower limit value, said control parameter calculating part determines the previous control parameter stored in said storage part as the new control parameter.

6. The electronic camera according to claim 5, wherein:

the conditional information determining part determines at least a color temperature of the subject; and the correction processing part calculates the control parameter based on the determined color temperature, and performs a white balance adjustment on the image data.

7. The electronic camera according to claim 5, wherein:

the conditional information determining part determines at least a contrast of the subject; and the correction processing part calculates the control parameter based on the determined contrast, and performs a gray level correction on the image data.

8. The electronic camera according to claim 5, wherein:

the conditional information determining part determines at least a color information of the subject; and the correction processing part calculates the control parameter based on the determined color information, and performs a color correction on the image data.

9. An electronic camera comprising:

an imaging part for imaging a subject to produce image data;

an image pickup time interval obtaining part for obtaining image pickup time intervals between each production of image data by the imaging part;

a conditional information determining part for determining conditional information of the subject;

a control parameter calculating part that calculates a control parameter every time said imaging part produces said image data, the control parameter being used for the correction processing on the image data based on the conditional information;

a storage part for storing previous control parameter calculated by said control parameter calculating part; and a correction processing part for performing correction processing on said image data, according to both the previous conditional information stored in said storage part and current conditional information which is determined by said conditional information determining part when said imaging part produces said image data, wherein when the time interval from previous image pickup time to present image pickup time determined by the image pickup time interval obtaining part is equal to or greater than a predetermined value, said control parameter calculating part determines the control parameter calculated according to the current conditional information as the new control parameter; and when the time interval is less than the predetermined value, said control parameter calculating part determines the previous control parameter stored in said storage part as the new control parameter.

10. The electronic camera according to claim 9, wherein:

the conditional information determining part determines at least a color temperature of the subject; and the correction processing part calculates the control parameter based on the determined color temperature, and performs a white balance adjustment on the image data.

11. The electronic camera according to claim 9, wherein:

the conditional information determining part determines at least a contrast of the subject; and the correction processing part calculates the control parameter based on the determined contrast, and performs a gray level correction on the image data.

12. The electronic camera according to claim 9, wherein:

the conditional information determining part determines at least a color information of the subject; and the correction processing part calculates the control parameter based on the determined color information, and performs a color correction on the image data.

* * * * *